US012733045B2

(12) United States Patent
Zhang et al.

(10) Patent No.: US 12,733,045 B2
(45) Date of Patent: Sep. 8, 2026

(54) PROCESSING METHOD FOR RELAY USER EQUIPMENT AND RELAY USER EQUIPMENT FOR RADIO RESOURCE CONNECTION SETUP

(71) Applicant: SHARP KABUSHIKI KAISHA, Sakai City (JP)

(72) Inventors: Chongming Zhang, Shanghai (CN); Renmao Liu, Shanghai (CN)

(73) Assignee: SHARP KABUSHIKI KAISHA, Sakai City (JP)

( * ) Notice: Subject to any disclaimer, the term of this patent is extended or adjusted under 35 U.S.C. 154(b) by 310 days.

(21) Appl. No.: 18/289,016

(22) PCT Filed: May 5, 2022

(86) PCT No.: PCT/CN2022/090910

§ 371 (c)(1),
(2) Date: Oct. 31, 2023

(87) PCT Pub. No.: WO2022/233296

PCT Pub. Date: Nov. 10, 2022

(65) Prior Publication Data

US 2024/0215082 A1 Jun. 27, 2024

(30) Foreign Application Priority Data

May 6, 2021 (CN) ........................ 202110492872.4

(51) Int. Cl.
*H04W 76/10* (2018.01)
*H04W 76/20* (2018.01)
(Continued)

(52) U.S. Cl.
CPC .......... *H04W 76/10* (2018.02); *H04W 76/20* (2018.02); *H04W 76/30* (2018.02); *H04W 92/18* (2013.01)

(58) Field of Classification Search
CPC ..... H04W 76/10; H04W 76/20; H04W 76/30; H04W 92/18; H04W 76/14; H04W 76/19;
(Continued)

(56) References Cited

U.S. PATENT DOCUMENTS

| | | | | |
|---|---|---|---|---|
| 2022/0124475 | A1* | 4/2022 | Kang | H04W 48/14 |
| 2022/0132558 | A1* | 4/2022 | Lee | H04W 24/10 |
| 2024/0147547 | A1* | 5/2024 | Chang | H04W 76/14 |

FOREIGN PATENT DOCUMENTS

| | | | | |
|---|---|---|---|---|
| CN | 108924962 A | | 11/2018 | |
| CN | 113396611 A | | 9/2021 | |
| WO | WO-2023211090 A1 | * | 11/2023 | H04W 76/14 |

OTHER PUBLICATIONS

Huawei et al., "Discussion on the CP procedures for L2 Relay", R2-2104131, 3GPP TSG-RAN WG2 Meeting #113-bis electronic, Online, Apr. 12-20, 2021.

(Continued)

*Primary Examiner* — Afshawn M Towfighi
(74) *Attorney, Agent, or Firm* — ScienBiziP, P.C.

(57) ABSTRACT

The present invention provides a processing method for relay user equipment (UE) and user equipment. The processing method for relay UE comprises the following steps: initiating, by the relay UE, an RRC connection establishment procedure, and during the initiation of the procedure, performing, by the relay UE, access control; when the access control is considered as an access attempt being barred, informing, by the relay UE, an upper layer that the access attempt is barred; generating/triggering, by the upper layer of the relay UE upon learning that the access attempt is barred, a PC5-S message; and transmitting, by the relay UE, the PC5-S message to remote UE, such that the remote UE, upon receiving the message, performs the following operation on the basis of an RRC state of the remote UE: when the remote UE is in an idle state/inactive state and a timer (Continued)

(A)

(B)

(C)

T300/T319 is running, the remote UE stops the timer T300/T319; when the remote UE is in a connected state, the remote UE initiates/triggers an RRC connection re-establishment procedure.

3 Claims, 2 Drawing Sheets

(51) Int. Cl.
*H04W 76/30* (2018.01)
*H04W 92/18* (2009.01)

(58) Field of Classification Search
CPC ..... H04W 76/27; H04W 88/04; H04W 76/23; H04W 92/10; H04W 76/18; H04W 40/22
See application file for complete search history.

(56) References Cited

OTHER PUBLICATIONS

Intel Corporation, "Control plane procedures for L2 U2N Relaying", R2-2103738, 3GPP TSG-RAN WG2 Meeting#113bise, E-meeting, Apr. 12-20, 2021.
Qualcomm Incorporated, "Summary of offline#611—Remaining proposals on relay (re)selection (Qualcomm)", R2-2104415, 3GPP TSG RAN WG2 Meeting #113bis-e, E-Conference, Apr. 12-20, 2021, Apr. 19, 2021.
ZTE, "Summary document of AI 8.7.4.1", R2-2104503, 3GPP TSG-RAN WG2 Meeting #113bis electronic, online, Apr. 12-20, 2021.

* cited by examiner

PROCESSING METHOD FOR RELAY USER EQUIPMENT AND RELAY USER EQUIPMENT FOR RADIO RESOURCE CONNECTION SETUP

TECHNICAL FIELD

The present invention relates to the technical field of wireless communications. More specifically, the present invention relates to a processing method for relay UE, and a corresponding base station and corresponding user equipment.

BACKGROUND

Remote UE can perform communication connection with a base station by means of relay UE. In order to transmit an RRC connection establishment request to the base station, the remote UE encapsulates the RRC connection establishment request message, and transmits the RRC connection establishment request message to the relay UE by means of a PC5 RRC connection between the remote UE and the relay UE. After the relay UE receives the PC5 RRC message carrying the RRC connection establishment request of the remote UE, in order to forward the PC5 RRC message to the base station, the relay UE initiates an RRC connection establishment request to the base station.

During the process of the connection establishment request of the relay UE, the following situations may occur:

situation 1: when the relay UE performs access control, an obtained result is access barring; and situation 2: the relay UE receives an RRC connection reject message from the base station.

The above situations mean that the relay UE cannot forward the RRC connection establishment request of the remote UE to the base station. In the prior art, the remote UE can go to an idle state only after waiting for a timer related to RRC connection establishment control to expire, and then re-trigger connection establishment again. The foregoing results in unnecessary latency of the RRC connection establishment of the remote UE.

SUMMARY

In order to solve the above problems, the present invention provides a processing method of relay UE and user equipment, which are intended to solve the problem of unnecessary latency of RRC connection establishment of remote UE because the remote UE can go to an idle state only after waiting for an RRC connection establishment control timer to expire.

According to one aspect of the present invention, a processing method for relay UE is provided, comprising the following steps:

initiating, by the relay UE, an RRC connection establishment procedure, and during the initiation of the procedure, performing, by the relay UE, access control;

when the access control is considered as an access attempt being barred, informing, by the relay UE, an upper layer that the access attempt is barred;

generating/triggering, by the upper layer of the relay UE, a PC5-S message upon learning that the access attempt is barred; and transmitting, by the relay UE, the PC5-S message to remote UE, such that the remote UE, upon receiving the message, performs the following operation on the basis of an RRC state of the remote UE:

when the remote UE is in an idle/inactive state and a timer T300/T319 is running, the remote UE stops the timer T300/T319; or when the remote UE is in a connected state, the remote UE initiates/triggers an RRC connection re-establishment procedure.

In the foregoing processing method for relay UE, preferably, the following steps are further comprised:

transmitting, by the relay UE during the initiation of the RRC connection establishment procedure or an RRC connection resumption procedure, an RRC connection establishment request message or an RRC connection resume request message to a network side or a base station;

informing, by the relay UE upon receiving an RRC reject message from the network side or the base station, the upper layer that access barring is applicable for all access categories;

generating, by the upper layer of the relay UE upon learning that the access is barred, the above-mentioned PC5-S message or a PC5-S message carrying the access barring; and transmitting, by the relay UE, the PC5-S message to the remote UE, such that the remote UE, upon receiving the message, performs the above operation on the basis of the RRC state of the remote UE.

In the foregoing processing method for relay UE, preferably, the following steps are further comprised:

transmitting, by the relay UE during the initiation of the RRC connection establishment procedure, an RRC connection establishment request message to the network side or the base station;

informing, by the relay UE upon receiving the RRC reject message from the network side or the base station, the upper layer that the RRC connection establishment has failed;

generating, by the upper layer of the relay UE upon learning that the RRC connection establishment has failed, the above-mentioned PC5-S message or a PC5-S message carrying the connection establishment failure; and transmitting, by the relay UE, the PC5-S message to the remote UE, such that the remote UE, upon receiving the message, performs the above operation on the basis of the RRC state of the remote UE.

In the foregoing processing method for relay UE, preferably, the following steps are further comprised:

transmitting, by the relay UE during the initiation of the RRC connection resumption procedure, an RRC connection resume request message to the network side or the base station;

informing, by the relay UE upon receiving the RRC reject message from the network side or the base station, the upper layer that the RRC connection resume has failed;

generating, by the upper layer of the relay UE upon learning that the RRC connection resume has failed, the above-mentioned PC5-S message or a PC5-S message carrying the connection resume failure; and transmitting, by the relay UE, the PC5-S message to the remote UE, such that the remote UE, upon receiving the message, performs the above operation on the basis of the RRC state of the remote UE.

In the foregoing processing method for relay UE, preferably, the following steps are further comprised:

starting, by the relay UE during the initiation of the RRC connection establishment procedure, the timer T300;

indicating, by the relay UE when T300 expires, to the upper layer that the RRC connection establishment has failed;

generating, by the upper layer of the relay UE upon learning that the RRC connection establishment has failed, the above-mentioned PC5-S message or a PC5-S message carrying the connection establishment failure; and transmitting, by the relay UE, the PC5-S message to the remote UE, such that the remote UE, upon receiving the message, performs the above operation on the basis of the RRC state of the remote UE.

In the foregoing processing method for relay UE, preferably, the following steps are further comprised:

starting, by the relay UE during the initiation of the RRC connection establishment procedure or the RRC connection resumption procedure, the timer T300 or T319;

performing, by the relay UE by means of indicating to the upper layer that the RRC connection establishment has failed, when the relay UE undergoes cell reselection during the running of T300 or T319 or when T319 expires, a related operation upon going to the idle state;

generating, by the upper layer of the relay UE upon learning that the RRC connection establishment has failed, the above-mentioned PC5-S message or the PC5-S message carrying the connection establishment failure; and transmitting, by the relay UE, the PC5-S message to the remote UE, such that the remote UE, upon receiving the message, performs the above operation on the basis of the RRC state of the remote UE.

In the foregoing processing method for relay UE, preferably, the following steps are further comprised:

for the following four situations, considering, by the relay UE, that the RRC connection establishment failure has occurred;

generating, by the relay UE when considering that the RRC connection establishment failure has occurred, the above-mentioned PC5-S message or the PC5-S message carrying RRC connection establishment failure indication information; and transmitting, by the relay UE, the PC5-S message to the remote UE, such that the remote UE, upon receiving the message, performs the above operation on the basis of the RRC state of the remote UE, wherein the four situations are:

the access attempt of the relay UE is barred;

the relay UE receives the RRC reject message from the network side or the base station, and informs the upper layer that access barring is applicable for all access categories;

the relay UE informs the upper layer that the RRC connection establishment has failed; and the relay UE informs the upper layer of an RRC connection release.

In the foregoing processing method for relay UE, preferably, the following steps are further comprised:

carrying, by the relay UE when considering that the RRC connection establishment failure has occurred, the indication information of the RRC connection establishment failure in the PC5-RRC message, and transmitting the PC5-RRC message carrying the indication information to the remote UE, such that the remote UE, upon receiving the indication information or the PC5-RRC message, or when the remote UE considers, on the basis of the indication information or the PC5-RRC message, that the current PC5-RRC connection is released, performs the following operation on the basis of the RRC state of the remote UE:

when the remote UE is in the idle/inactive state and the timer T300/T319 is running, stopping, by the remote UE, the timer T300/T319; or when the remote UE is in the connected state, triggering, by the remote UE, the RRC connection re-establishment procedure.

According to another aspect of the present invention, user equipment (UE) is provided, comprising: a processor; and a memory storing instructions, wherein the instructions, when run by the processor, cause the user equipment to perform the processing method described above.

According to the processing method for relay UE and the corresponding user equipment involved in the present disclosure, no unnecessary latency will be caused to RRC connection establishment of remote UE.

DETAILED DESCRIPTION

The following describes the present invention in detail with reference to the accompanying drawings and specific embodiments. It should be noted that the present invention should not be limited to the specific embodiments described below. In addition, detailed descriptions of well-known technologies not directly related to the present invention are omitted for the sake of brevity, in order to avoid obscuring the understanding of the present invention.

Prior to the specific description, several terms mentioned in the present invention are illustrated as follows. The terms involved in the present invention shall have the meanings set forth below, unless otherwise indicated.

UE: User Equipment
NR: New Radio
LTE: Long Term Evolution
eLTE: enhanced Long Term Evolution
RRC: Radio Resource Control (layer)
MAC: Medium Access Control (layer)
MAC CE: MAC Control Element
RRC: Radio Resource Control
RRC_CONNECTED: RRC connected state
RRC INACTIVE: RRC inactive state
RRC_IDLE: RRC idle state
RAN: Radio Access Network
Sidelink: Sidelink communication
SL: Sidelink
ProSe: Proximity-based services A plurality of embodiments according to the present invention are specifically described below, with an NR mobile communications system and the subsequent evolved version thereof serving as exemplary application environments, and with a base station and UE that support NR serving as examples. However, it should be noted that the present invention is not limited to the following embodiments, but is applicable to more other wireless communications systems, such as an eLTE communication system, or an NB-Iot system, or an LTE-M system. Moreover, the present invention may be applicable to other base stations and user equipment, such as base stations and user equipment supporting eLTE/NB-IOT/LTE-M.

In NR access technology, UE and a base station are connected by means of a Uu interface. According to the connection state of the UE over the Uu interface, the states of the UE can be divided into an RRC idle state (IDLE), an RRC connected state, and an RRC inactive state (INACTIVE). In the RRC inactive state, although the UE has no connection over the air interface, an access stratum context (AS context) of the UE is reserved on the base station side and the UE side, and the UE is assigned an I-RNTI, which is used by the UE to resume an RRC connection. This intermediate state can be considered as a connection suspended state, or it can be considered as a connection inactive state.

Figure 1:
FIG. 1 is a schematic diagram showing UE-to-network relay.
Figure 1:
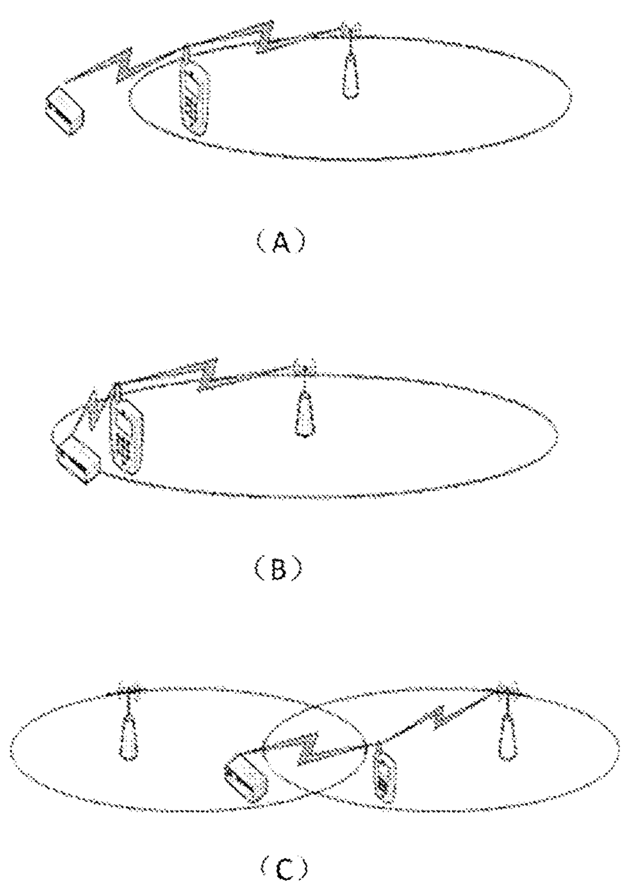

UE-to-network relaying is as shown in FIG. 1. In scenario 1(A) and scenario 2(B), the left side is remote UE, the middle is relay UE, and the right side is a network (also referred to as a base station, a network, or an NW in the present specification). In scenario 3(C), the two sides are networks, and the middle, sequentially from left to right, is respectively remote UE and relay UE. The remote UE and the relay UE are connected to each other by means of a PC5 interface, and the relay UE is connected to the network by means of a Uu interface. Because the remote UE is far from the network or because the communication environment is poor, the relay UE is needed to relay and forward signaling and data between the remote UE and the network.

Figure 2:
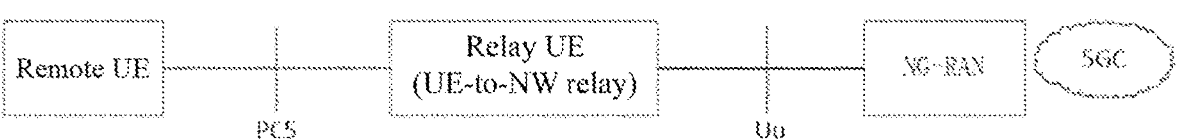
FIG. 2 is a schematic diagram showing a UE-to-network relay architecture interface.

An interface of the UE-to-network relay architecture is as shown in FIG. 2, and the remote UE and the relay UE are connected by means of a PC5 (ProSe protocol 5) interface. A PC5 interface is an interface for performing control plane and user plane sidelink communication between UE and UE. For sidelink unicast, a PC5-RRC connection is an access stratum (AS) logical connection between a pair of a source layer-2 ID and a target layer-2 ID. Setup of one PC5 unicast link corresponds to setup of one PC5-RRC connection. The PC5-RRC message refers to a message transmitted on the PC5-RRC connection, which is mainly generated and processed by a PC5 RRC layer of the UE. The PC5-S connection is a non-access stratum (NAS) logical connection between a pair of a source layer-2 ID and a target layer-2 ID, or may be considered as a logical connection at a sidelink communication higher layer. The PC5-S message (also referred to as PC5-S signaling) refers to a message or signaling transmitted on the PC5 non-access stratum, and is mainly generated or processed by the non-access stratum of the PC5 interface.

RRC Connection Establishment

In order to communicate with the base station or the network side, the UE in the idle state needs to establish an RRC connection. To achieve the foregoing purpose, the UE performs an RRC connection establishment procedure. During initiation of the foregoing procedure, the UE starts a timer T300 for management of the connection establishment procedure.

RRC Connection Resume

In order to communicate with the base station or the network side, the UE in the inactive state needs to resume the RRC connection. To achieve the foregoing purpose, the UE performs an RRC connection resumption procedure. During initiation of the foregoing procedure, the UE starts a timer T319 for management of the connection resumption procedure.

RRC Connection Re-Establishment

In order to resume communication with the base station or the network side, the UE in the connected state needs to re-establish the RRC connection. To achieve the foregoing purpose, the UE performs an RRC connection re-establishment procedure. During initiation of the foregoing procedure, the UE starts a timer T311 for management of the connection resumption procedure.

Embodiment 1

Figure 3:
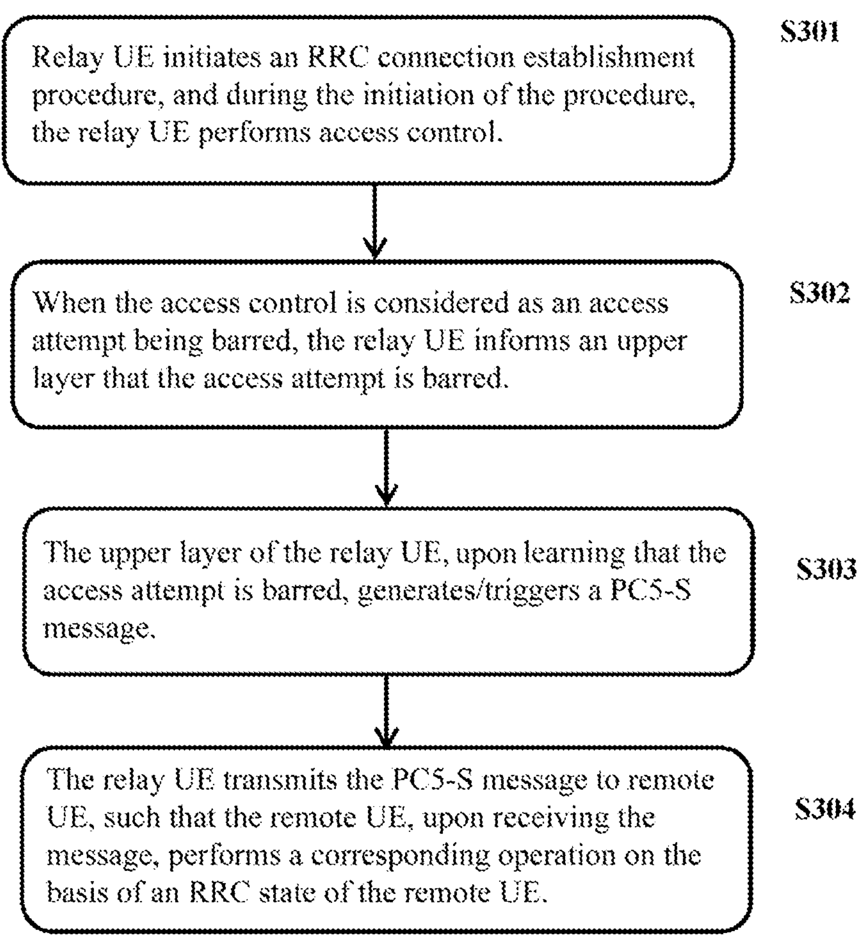
FIG. 3 is a flowchart showing a processing method for relay UE relating to an embodiment of the present invention.

The present embodiment provides a processing method for relay UE, which, as shown in FIG. 3, includes the following steps:

S301: the relay UE initiates an RRC connection establishment procedure, and during the initiation of the procedure, the relay UE performs access control.

S302: when the access control is considered as an access attempt being barred, the relay UE informs an upper layer that the access attempt is barred, and optionally, the relay UE ends the RRC connection establishment procedure. The upper layer herein mainly refers to a non-access stratum of the UE, also referred to as an NAS. The RRC connection establishment procedure is controlled and managed by an RRC layer of the UE. The non-access stratum is present above the RRC layer of the UE, and controls other behaviors of the UE.

S303: after the upper layer of the relay UE learns that the access attempt is barred, the relay UE may generate/trigger a PC5-S message, such as a PC5 link release message, or the message may be a PC5-S message carrying the access attempt of the relay UE being barred.

S304: the relay UE transmits the PC5-S message to remote UE. The remote UE, upon receiving the message, performs the following operation on the basis of an RRC state of the remote UE:

When the remote UE is in an IDLE/INACTIVE state (or when the remote UE is not in an RRC connected state), and when T300/T319 is running, the remote UE stops T300/T319, and optionally, aborts the RRC connection establishment, which may specifically include re-establishing RLC for all radio bearers. Preferably, if the remote UE is in the INACTIVE state, the remote UE may abort RRC connection resume, which may specifically include suspending SRB1, and discarding a current key.

When the remote UE is in the connected state, the remote UE can initiate/trigger an RRC connection re-establishment procedure.

Optionally, the above PC5-S message may trigger the remote UE to perform cell reselection.

Embodiment 2

Relay UE initiates an RRC connection establishment procedure. In the foregoing procedure, the relay UE transmits an RRC connection establishment request message (RRCSetupRequest message) to a network or to a base station, and the relay UE receives an RRC reject message (RRCReject message) transmitted by the network as a response to the RRC connection establishment request message.

Alternatively, the relay UE initiates an RRC connection resumption procedure. In the foregoing procedure, the relay UE transmits an RRC connection resume request message (RRCResumeRequest message) to the network or to the base station. Then the relay UE receives an RRC reject message (RRCReject message) transmitted by the network as a response to the RRC connection resume request message.

The relay UE, upon receiving the RRC reject message, informs an upper layer that access barring is applicable for all access categories, and optionally ends the RRC connection establishment/resume procedure.

After the upper layer of the relay UE learns that the access is barred, the relay UE may generate the PC5-S message in Embodiment 1, or generate a PC5-S message carrying information that the access of the relay UE is barred, and perform the operation as described in Embodiment 1.

Embodiment 3

Relay UE initiates an RRC connection establishment procedure. In the foregoing procedure, the relay UE transmits an RRC connection establishment request message (RRCSetupRequest message) to a network or to a base station. Then the relay UE receives an RRC reject message (RRCReject message) transmitted by the network.

The relay UE, upon receiving the RRC reject message, informs an upper layer that the RRC connection establishment has failed (the failure to setup the RRC connection), and optionally, ends the RRC connection establishment procedure.

After the upper layer of the relay UE learns that the RRC connection establishment has failed, the relay UE may generate the PC5-S message in Embodiment 1, or generate a PC5-S message carrying RRC connection establishment failure information, and perform the operation as described in Embodiment 1. Preferably, the generated PC5-S message carries the RRC connection establishment failure information of the relay UE.

Embodiment 4

Relay UE initiates an RRC connection resumption procedure. In the foregoing procedure, the relay UE transmits an RRC connection resume request message (RRCResumeRequest message) to a network or to a base station. Then the relay UE receives an RRC reject message (RRCReject message) transmitted by the network.

The relay UE, upon receiving the RRC reject message, informs an upper layer that the RRC connection resume has failed (the failure to resume the RRC connection), and optionally, ends the RRC connection resumption procedure (end the RRC establishment).

After the upper layer of the relay UE learns that the RRC connection resume has failed, the relay UE can generate the PC5-S message in Embodiment 1, or generate a PC5-S message carrying RRC connection resume failure information, and perform the operation as described in Embodiment 1. Preferably, the generated PC5-S message carries the RRC connection resume failure information of the relay UE.

Embodiment 5

Relay UE initiates an RRC connection establishment procedure. In the foregoing procedure, the relay UE starts a timer T300. When T300 expires, the relay UE informs an upper layer that the RRC connection establishment has failed (the failure to establish the RRC connection).

After the upper layer of the relay UE learns that the RRC connection establishment has failed, the relay UE can generate the PC5-S message in Embodiment 1, or generate a PC5-S message carrying the connection establishment failure, and perform the operation as described in Embodiment 1.

Embodiment 6

Relay UE initiates an RRC connection establishment procedure. In the foregoing procedure, the relay UE starts a timer T300.

Alternatively, the relay UE initiates an RRC connection resumption procedure. In the foregoing procedure, the relay UE starts a timer T319.

During the running of the above T300 or T319, the relay UE undergoes cell reselection, and the relay UE proceeds to perform a related operation upon going to an idle state (going to RRC_IDLE), such as informing an upper layer that the RRC connection establishment has failed (the failure to establish the RRC connection).

After the upper layer of the relay UE learns that the RRC connection establishment has failed, the relay UE may generate the PC5-S message in Embodiment 1, or generate a PC5-S message carrying RRC connection establishment failure information, and perform the operation as described in Embodiment 1. Preferably, the generated PC5-S message carries the RRC connection establishment failure information of the relay UE.

Optionally, T319 may expire, and the relay UE may proceed to perform a related operation upon going to an idle state (going to RRC_IDLE), such as informing the upper layer that the RRC connection establishment has failed (the failure to establish the RRC connection).

After the upper layer of the relay UE learns that the RRC connection establishment has failed, the relay UE can generate the PC5-S message in Embodiment 1, or generate a PC5-S message carrying the connection establishment failure, and perform the operation as described in Embodiment 1. Preferably, the generated PC5-S message carries the RRC connection establishment failure information of the relay UE.

Embodiment 7

For the following situations, relay UE may consider that an RRC connection establishment failure has occurred (the failure to setup an RRC connection).

Situation 1: an access attempt of the relay UE is barred.

Situation 2: the relay UE receives an RRC reject message transmitted by a network side, and informs an upper layer that access barring is applicable for all access categories.

Situation 3: the relay UE informs the upper layer that RRC connection establishment has failed (the failure to establish the RRC connection). The foregoing may occur when the UE receives an RRC reject message transmitted by the network side, or T300 of the relay UE expires.

Situation 4: the relay UE informs the upper layer of the UE of an RRC connection release (indicates the release of the RRC connection to the upper layer). The foregoing situation may occur when T319 of the relay UE expires, or may occur when the relay UE undergoes cell reselection during the running of T300 or T319 of the relay UE.

When the UE considers that the RRC connection establishment has failed, the UE can generate the PC5-S message in Embodiment 1, or generate a PC5-S message carrying RRC connection establishment failure information, and the relay UE performs the operation as described in Embodiment 1. Specifically, the relay UE considers that the RRC connection establishment failure has occurred in the above situations, and then informs the upper layer of the relay UE. The upper layer of the relay UE generates the PC5-S message, and the relay UE performs the operation as described in Embodiment 1. Preferably, the generated PC5-S message carries the RRC connection establishment failure information of the relay UE.

Embodiment 8

On the basis of Embodiment 7, when the relay UE considers that the RRC connection establishment has failed, the relay UE can inform the remote UE. Specifically, the PC5-RRC message may carry indication information indicating the RRC connection establishment failure, and the relay UE transmits the PC5-RRC message carrying the indication information to the remote UE. The indication information indicating the RRC connection establishment failure may also be carried in a MAC CE, and the MAC CE is transmitted by the relay UE to the remote UE.

Optionally, when the remote UE receives the indication information or the PC5-RRC message/MAC CE carrying the indication information, the remote UE may consider that the PC5-RRC connection is released.

When the remote UE receives the indication information or the PC5-RRC message, or when the remote UE considers that the current PC5-RRC connection is released, if T300/T319 is running, then the remote UE stops T300/T319, and optionally, aborts the RRC connection establishment, which may specifically include re-establishing RLC for all radio bearers. Preferably, if the remote UE is in the INACTIVE state, the RRC connection resume may be aborted, which specifically may include suspending SRB1 and discarding a current key. In addition, preferably, the remote UE, upon receiving the indication information or the PC5-RRC message, may trigger relay reselection.

Optionally, the remote UE, upon receiving the MAC CE carrying the indication information, indicates to an upper layer of the remote UE, which herein mainly refers to a PC5 RRC layer.

It can be considered that there is interaction between the PC5 RRC layer of the remote UE and an RRC layer of a Uu interface, such that the PC5 RRC layer of the remote UE, upon receiving the indication information, can inform the RRC layer of the Uu interface, and then perform the aforementioned operations, such as stopping the timer and aborting the connection establishment.

Embodiment 9

For the four situations mentioned in Embodiment 7, the relay UE may consider/determine that a radio link failure (RLF) has occurred.

When the relay UE considers that the RLF has occurred, the relay UE can generate the PC5-S message in Embodiment 1, or generate a PC5-S message carrying RLF indication information and perform the operation as described in Embodiment 1. Specifically, the relay UE considers that the RLF has occurred in the above situations, and then informs the upper layer of the relay UE. The upper layer of the relay UE generates the PC5-S message, and the relay UE performs the operation as described in Embodiment 1. Preferably, the generated PC5-S message carries the RLF indication information of the relay UE.

Embodiment 10

On the basis of Embodiment 9, when the relay UE considers that the RLF has occurred, the relay UE can inform the remote UE. Specifically, the RLF indication information may be carried in the PC5-RRC message, and the relay UE may transmit the PC5-RRC message carrying the RLF indication information to the remote UE. The relay UE may also carry the RLF indication information in a MAC CE and transmits the MAC CE to the remote UE.

Optionally, the remote UE, upon receiving the indication information or the PC5-RRC message/MAC CE carrying the indication information, may consider that a PC5-RRC connection is released.

The remote UE, upon receiving the indication information or the PC5-RRC message, or when the remote UE considers that the current PC5-RRC connection is released, may perform the following operation on the basis of an RRC state of the remote UE:

When the remote UE is in an IDLE/INACTIVE state (or when the remote UE is not in an RRC connected state), and when T300/T319 is running, the remote UE stops T300/T319, and optionally, aborts the RRC connection establishment, which may specifically include re-establishing RLC for all radio bearers. Preferably, if the remote UE is in the INACTIVE state, then the remote UE may abort RRC connection resume, which may specifically include suspending SRB1, and discarding a current key.

When the remote UE is in a connected state, the remote UE can trigger an RRC connection re-establishment procedure.

Preferably, the remote UE, upon receiving the indication information or the PC5-RRC message, can trigger relay reselection.

Optionally, the remote UE, upon receiving the MAC CE carrying the indication information, indicates to the upper layer of the remote UE, which herein mainly refers to a PC5 RRC layer.

Embodiment 11

In all of the above embodiments, the relay UE transmits the generated PC5-S message to the remote UE and triggers the remote UE to perform relay reselection. Yet another implementation of the foregoing procedure may be as follows:

the remote UE, upon receiving the PC5-S message, instructs/triggers the remote UE to perform relay reselection to a lower layer of the remote UE, i.e., the PC5-RRC layer.

When the remote UE performs relay reselection and reselects relay UE, which, preferably, is different from the previous relay UE, the remote UE can perform the following operation:

in one case, the timer T300 of the remote UE is running. When the reselection of the relay UE occurs for the remote UE while T300 is running, the remote UE stops T300, and goes to the idle state, and optionally, performs a related operation upon going to the idle state (going to RRC_IDLE), such as indicating the release of the RRC connection to the upper layer together with a release cause, wherein the release cause is set to RRC connection failure.

In another case, the timer T319 of the remote UE is running. When the reselection of the relay UE occurs for the remote UE, the remote UE stops T319 and goes to the idle state, and optionally, performs a related operation upon going to the idle state (going to RRC_IDLE), such as releasing a configuration, which may be releasing a suspendConfig configuration, and indicating the release of the RRC connection to the upper layer together with a release cause, wherein the release cause is set to "RRC resume failure".

When the remote UE is in the CONNECTED state, the remote UE can initiate/trigger the RRC connection re-establishment procedure.

Figure 4:
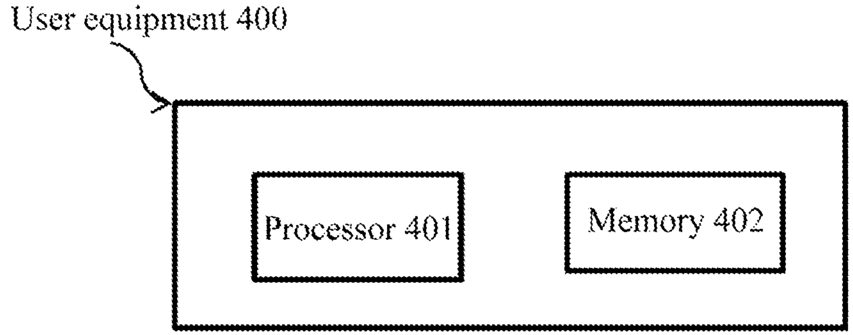
FIG. 4 is a simplified structural block diagram of user equipment relating to the present invention.

FIG. 4 is a simplified structural block diagram of user equipment relating to the present invention.

As shown in FIG. 4, the user equipment 400 at least includes a processor 401 and a memory 402. The processor 401 may include, for example, a microprocessor, a microcontroller, an embedded processor, and the like. The memory 402 may include, for example, a volatile memory (for example, a random access memory (RAM)), a hard disk drive (HDD), a non-volatile memory (for example, a flash memory), or other memory systems. The memory 402 stores program instructions. When the instructions are run by the processor 401, one or several steps in the processing method for relay UE described above in FIG. 3 of the present disclosure can be performed.

The method and related devices according to the present disclosure have been described above in conjunction with preferred embodiments. It should be understood by those skilled in the art that the method shown above is only exemplary, and the above embodiments can be combined with one another as long as no contradiction arises. The method of the present invention is not limited to the steps or sequences illustrated above.

The user equipment shown above may include more modules, for example, may also include modules that can be developed or developed in the future and can be used for base stations, MMEs, or UE, and so on. Various identifiers shown above are only exemplary, not for limitation, and the present disclosure is not limited to specific information elements serving as examples of these identifiers. A person skilled in the art could make various alterations and modifications according to the teachings of the illustrated embodiments.

It should be understood that the above embodiments of the present disclosure may be implemented through software, hardware, or a combination of software and hardware. For example, various components of the base station and user equipment in the above embodiments can be implemented by multiple devices, and these devices include, but are not limited to: an analog circuit device, a digital circuit device, a digital signal processing (DSP) circuit, a programmable processor, an application-specific integrated circuit (ASIC), a field-programmable gate array (FPGA), a complex programmable logic device (CPLD), and the like.

The program running on the device according to the present invention may be a program that enables the computer to implement the functions of the embodiments of the present invention by controlling a central processing unit (CPU). The program or information processed by the program may be temporarily stored in a volatile memory (for example, a random access memory (RAM)), a hard disk drive (HDD), a non-volatile memory (for example, a flash memory), or other memory systems.

The program for implementing the functions of the embodiments of the present invention may be recorded on a computer-readable recording medium. The corresponding functions may be achieved by reading programs recorded on the recording medium and executing them by the computer system. The phrase "computer system" herein may be a computer system embedded in the device, which may include operating systems or hardware (e.g., peripherals). The phrase "computer-readable recording medium" may refer to a semiconductor recording medium, an optical recording medium, a magnetic recording medium, a recording medium for programs that are dynamically stored for a short time, or any other recording medium readable by a computer.

Various features or functional modules of the device used in the above embodiments may be implemented or executed by circuits (for example, monolithic or multi-chip integrated circuits). Circuits designed to execute the functions described in the present description may include general-purpose processors, digital signal processors (DSPs), application-specific integrated circuits (ASICs), field-programmable gate arrays (FPGAs) or other programmable logic devices, discrete gates or transistor logic, discrete hardware components, or any combination of the above. The general-purpose processor may be a microprocessor, or may be any existing processor, controller, microcontroller, or state machine. The circuit may be a digital circuit or an analog circuit. When new integrated circuit technologies that replace existing integrated circuits emerge because of the advances in semiconductor technology, one or a plurality of embodiments of the present invention may also be implemented using these new integrated circuit technologies.

Furthermore, the present invention is not limited to the embodiments described above. Although various examples of the embodiments have been described, the present invention is not limited thereto. Fixed or non-mobile electronic devices installed indoors or outdoors, such as AV equipment, kitchen equipment, cleaning equipment, air conditioners, office equipment, vending machines, and other household appliances, may be used as terminal devices or communications devices.

The embodiments of the present invention have been described in detail above with reference to the accompanying drawings. However, the specific structures are not limited to the above embodiments. The present invention also includes any design modifications that do not depart from the main idea of the present invention. In addition, various modifications can be made to the present invention within the scope of the claims. Embodiments resulting from appropriate combination of the technical means disclosed in the different embodiments are also included within the technical scope of the present invention. In addition, components having the same effect described in the above embodiments may be replaced with one another.

The invention claimed is:

1. A relay User Equipment (UE), comprising:

a processor; and a memory, wherein the memory stores instructions that, when executed by the processor, cause the relay UE to:

initiate a Radio Resource Control (RRC) connection establishment procedure;

transmit an RRC setup request message to a network to setup an RRC connection; and upon receiving, from the network, an RRC reject message as a response to the RRC setup request message:

inform an upper layer of an RRC layer of the relay UE about a failure to setup the RRC connection;

in a case that a connection between the relay UE and a remote UE is a PC5-S connection, transmit, to the remote UE, a PC5 link release message; and in a case that a connection between the relay UE and the remote UE is a PC5 RRC connection, transmit, to the remote UE, a PC5 RRC message indicating the failure.

2. The relay UE according to claim 1, wherein the instructions that, when executed by the processor, further cause the relay UE to:

initiate an RRC connection resumption procedure;

transmit an RRC resume request message to the network to resume the RRC connection; and upon receiving, from the network, another RRC reject message as a response to the RRC resume request message:

inform the upper layer of the RRC layer of the relay UE about a second failure to resume the RRC connection;

in the case that the connection between the relay UE and the remote UE is the PC5-S connection, transmit, to the remote UE, a PC5 link release message; and in the case that the connection between the relay UE and the remote UE is the PC5 RRC connection, transmit, to the remote UE, a PC5 RRC message indicating the second failure.

3. A control method performed by a relay User Equipment (UE), the control method comprising:

initiating a Radio Resource Control (RRC) connection establishment procedure;

transmitting an RRC setup request message to a network to setup an RRC connection; and upon receiving, from the network, an RRC reject message as a response to the RRC setup request message:

informing an upper layer of an RRC layer of the relay UE about a failure to setup the RRC connection;

in a case that a connection between the relay UE and a remote UE is a PC5-S connection, transmitting, to the remote UE, a PC5 link release message; and in a case that a connection between the relay UE and the remote UE is a PC5 RRC connection, transmitting, to the remote UE, a PC5 RRC message indicating the failure.

* * * * *